United States Patent Office 3,521,174
Patented July 21, 1970

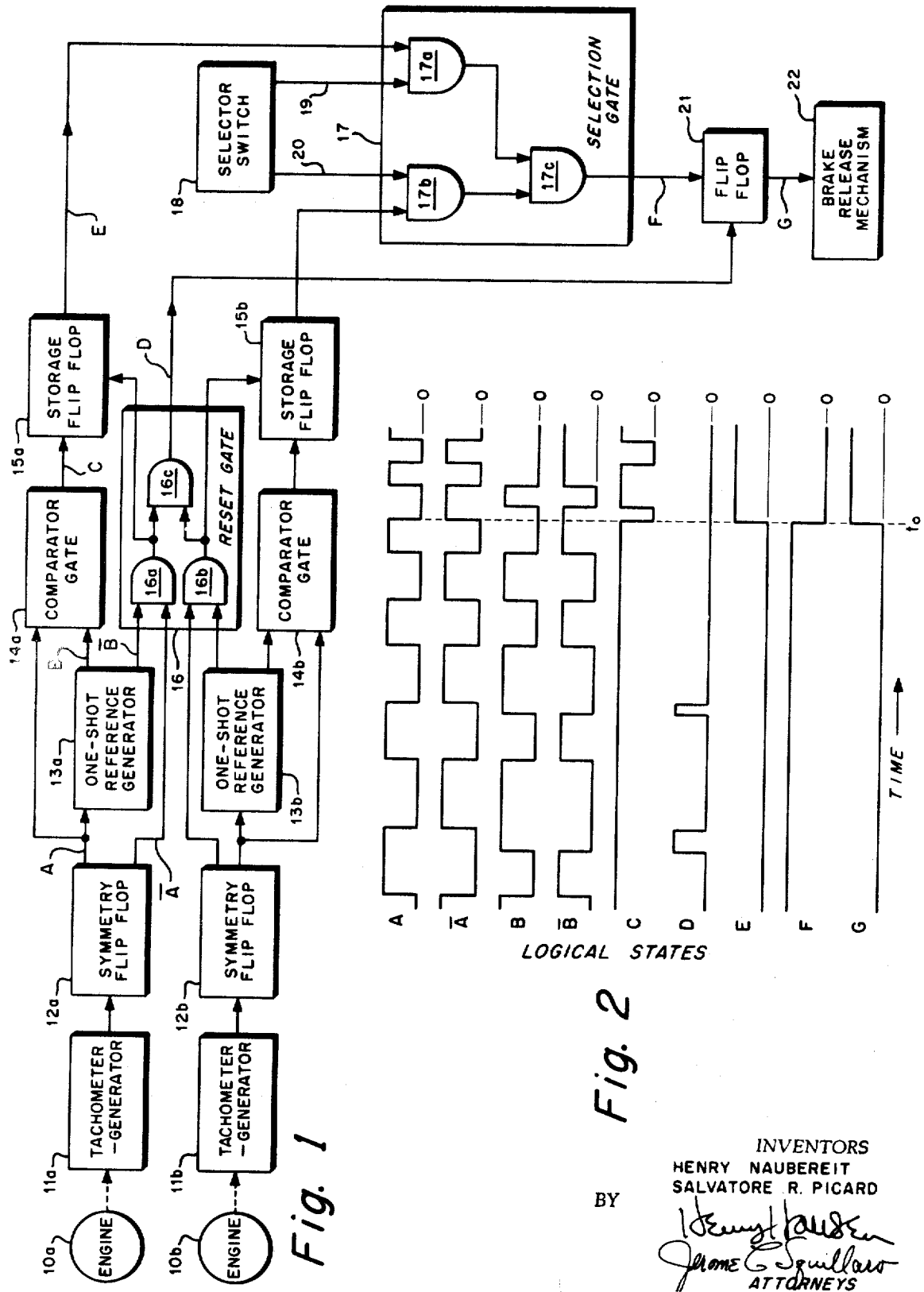

3,521,174
FREQUENCY SENSITIVE CONTROL CIRCUIT
Henry Naubereit, Cherry Hill, N.J., and Salvatore R. Picard, Hatboro, Pa., assignors to the United States of America as represented by the Secretary of the Navy
Filed Mar. 23, 1967, Ser. No. 625,929
Int. Cl. G01p 3/22
U.S. Cl. 328—138    12 Claims

ABSTRACT OF THE DISCLOSURE

An apparatus for sensing the speed of a catapult engine and converting the speed to an alternating current signal having a frequency proportional to the engine speed, for launching an aircraft when the engine speed exceeds a predetermined value which is set by a reference signal generator. The reference signal and the alternating current signal are compared in a comparator which provides an output signal to a storage device when the engine has achieved launch speed; the output signal is then coupled through a selection gate to a brake release mechanism for initiating launch. A second signal channel similar to the first and including another catapult engine, is connected to the selection gate to enable either or both catapult engines to be selected for aircraft launching.

STATEMENT OF GOVERNMENT INTEREST

The invention described herein may be manufactured and used by or for the Government of the United States of America for governmental purposes without the payment of any royalties thereon or therefor.

BACKGROUND OF INVENTION

The present invention relates to a frequency sensitive control circuit, and more particularly, to a control circuit for providing a control signal when the frequency of an alternating current signal is greater than a predetermined value.

In numerous applications it is necessary to know when the frequency of an alternating current signal has exceeded a predetermined value. For example, in catapult launching an aircraft from either an aircraft carrier or any short air strip, it is necessary to know when the power of a catapult engine has achieved a value sufficient to launch the aircraft. Since engine power is related to engine speed, it has been the general practice to sense the engine speed by the use of tachometer generators and to manually bring the catapult engine up to a prelaunch speed before initiating a programmed launch operation which comprises automatically accelerating the engine from the prelaunch speed to launch speed. Simultaneous with the launch command, a preset time delay relay is energized to control a brake release mechanism (and hence launch the aircraft) a fixed time after initiating the programmed launch command. Although this technique has enjoyed a certain degree of success, it has not proved to be entirely satisfactory under all operational conditions. One of the critical problems encountered in this launching technique has been to determine the desired time delay setting for the relay so that the brake release mechanism is actuated only after the engine has achieved proper launch speed. If the brake is released too soon, the aircraft will be subjected to hazardous acceleration surges and if the brake is released too late, there will be excessive wear on the brake mechanism. To prevent either of these conditions from occurring, it is therefore necessary to select the proper delay time. This time, however, is not fixed, but rather is dependent upon the variations in catapult engine performance caused by fuel flow, gear linkages, throttle position, ambient temperature conditions, mechanical wear on parts and hydraulic pressure changes. Accordingly, it is virtually impossible to select the time delay necessary to achieve proper launch conditions.

To further complicate the launching problem, it is the general practice to employ two catapult engines connected to a common drive mechanism for providing shorter launching distances or for launching heavier aircraft. In these situations, it is essential that both engines have attained the proper launch conditions before the brake mechanism is released, otherwise, the effectiveness of the two engines is defeated.

SUMMARY OF THE INVENTION

An object of the present invention is therefore to provide an apparatus for sensing the output speed of a catapult engine and provide a signal to a brake release mechanism only when the engine is has attained a proper launch condition independent of any delays in the system. Briefly, the invention contemplates the use of a tachometer-generator for converting the engine speed to an alternating current signal, whose frequency is proportional to engine speed. This signal is converted to a symmetrical square wave which is then used to actuate a one-shot reference generator for providing a reference signal having a predetermined period. The symmetrical square wave and the reference signal are applied to a comparison gate which provides an output only when the period of the alternating current input signal is less than that of the reference generator signal. In the event that it is necessary to provide an output signal only when the periods of two independent alternating current signals are less than predetermined values, a storage and selection apparatus is employed so that no output will appear until this condition is met.

Other objects and many of the attendant advantages of this invention will be readily appreciated as the same becomes better understood by reference to the following detailed description when considered in connection with the accompanying drawing.

BRIEF DESCRIPTION OF THE DRAWING

FIG. 1 shows a block diagram of an embodiment of the present invention; and

FIG. 2 illustrates the logical conditions at various points in the embodiment of FIG. 1 as a function of time.

DESCRIPTION OF PREFERRED EMBODIMENT

Referring now to FIG. 1 of the drawing, there is shown an embodiment of the invention having two parallel signal channels comprising substantially identical elements. A suffix *a* is applied to the numbered elements of one channel and a suffix *b* to the numbered elements of the other channel to distinguish between the elements of each channel.

The power output shaft rotation of catapult engines 10*a* and 10*b* are converted to alternating current signals by tachometer-generators 11*a* and 11*b*, respectively. These alternating current signals are preferably of a rectangular wave shape having periods proportional to the periods of the catapult engines; however, if the signals are of a sinusoidal nature, they may be converted to a rectangular wave shape by the use of a Schmitt trigger, a limiting amplifier, or other appropriate circuits well known to those skilled in the art. The output of the tachometer-generators 11*a* and 11*b* are applied to symmetry flip flops 12*a* and 12*b* which convert the rectangular shaped signals into symmetrical square waves. The symmetry flip flops may be of the R-S type well known to those skilled in the art; however, other flip flops could obviously be employed to perform the same function.

Referring now to FIG. 2, the complementary outputs of the symmetry flip flop 12*a* are shown on lines A and $\overline{A}$, respectively. The A output of a flip flop 12a and a like output from flip flop 12b as shown in FIG. 1, are connected to one-shot reference generators 13a and 13b, respectively. The function of each one-shot reference generator is to provide a selectively variable width output pulse each time an input pulse is applied from the symmetry flip flops 12a and 12b. Various well known devices may be used for this purpose, such as a monostable multivibrator or a bistable multivibrator with a feedback signal from the output to the reset input after a selected time interval. One output of the one-shot reference generator 13a shown on line B of FIG. 2 and the A output of the symmetry flip flop 12a are connected to the inputs of a two-input comparator gate 14a. The function of the comparator gate 14a is to provide an output pulse only when the period of the signal from the symmetry flip flop 12a is less than the period (pulse width) of the signal from the reference generator 13a as illustrated on line C of FIG. 2. This comparison function can be easily achieved by the use of a two-input gate which produces a logical "0" only when both inputs are logical "0's." A second comparator gate 14b, similar to comparator gate 14a, is connected to the symmetry flip flop 12b and the one-shot reference generator 13b. The output of comparator gates 14a and 14b are each connected to an input of storage flip flops 15a and 15b, respectively. The output of the storage flip flop 15a illustrated on line E of FIG. 2 and a similar output from the storage flip flop 15b are set to a logical "1" level by the application of a "0" pulse at their respective inputs as shown in FIG. 2. Storage flip flop 15a is reset by an output pulse from a gate 16a which produces a logical "1" only when both input are logical "0's." This occurs each time the period of the output pulse, $\overline{A}$, from the symmetry flip flop 12a is greater than the output pulse, $\overline{B}$, from the one-shot reference generator 13a. In a similar manner, storage flip flop 15b is reset by an output pulse from a gate 16b which produces a logical "1" only when both inputs are logical "0's." This occurs each time the period of the output pulse from the symmetry flip flop 12b is greater than the output pulse from the one-shot reference generator 13b. In this way, the storage flip flops 15a and 15b are held in the OFF condition until the period of the alternating current input signals are less than that of the one-shot reference generator.

The output of the storage flip flops 15a and 15b are coupled to a selection gate 17 which is controlled by a selector switch 18. The selector switch 18 determines whether an output is required from both storage flip flops 15a and 15b or from either storage flop flips 15a and 15b to provide an output from the selection gate 17. This may be accomplished within the selection gate 17 by the use of gates 17a, 17b and 17c. Gates 17a and 17b, which produce a logical "1" only when both inputs are logical "0's", each have an input connected to the output of storage flip flops 15a and 15b. A second input to these gates is provided by the selector switch 18 on conductors 19 and 20. The outputs of gates 17a and 17b are connected to the inputs of gate 17c which produces a logical "0" output signal only when both inputs are logical "0's". The output of the selection gate 17 is obtained from gate 17c.

The function of the selection gate 17 is to provide an output signal only when either or both storage flip flops 15a and 15b are in the logical "1" condition, depending upon the condition of the selector switch 18. For example, if a logical "1" is applied to conductor 20 by selector switch 18, and a logical "0" on conductor 19, then when a logical "1" appears at the output of storage flip flop 15b, the output of gate 17b will remain unchanged since the logical "1" from the selector switch 18 previously caused the gate 17b to have a logical "0" output. When a logical "1" appears at the output of the storage flip flop 15a, the gate 17a will switch from a logical "1" output to a logical "0" output, and hence, gate 17c, having logical "0's" at its inputs, will provide a logical "0" at its output. During this condition, the logical state of the storage flip flop 15b has no effect on the final output of the selection gate 17. In a similar manner, the selector switch 18 could reverse the logical states on conductors 19 and 20 and cause storage flip flop 15a to be ineffective in changing in the output of the selection gate 17. If logical "0's" appear on both conductors 19 and 20, then it would be obvious that logical "1's" must be provided by storage flip flops 15a and 15b before the output of the selection gate 17 switches from a logical "1" to a logical "0." This condition is illustrated on line F of FIG. 2.

The output of the selection gate 17 is connected to an input of a flip flop 21 which upon receiving a logical "0" from the selection gate 17 provides a logical "1" at its output, as illustrated on line G of FIG. 2. The output from flip flop 21 is conected to a brake release mechanism 22 which is controlled by the logical state of the flip flop 21. In this particular application, the brake release mechanism is energized when a logical "1" appears at the output of flip flop 21. A reset signal is provided for flip flop 21 by a gate 16c which produces a logical "1" in response to either or both inputs being logical "1's" and gate 16c having its inputs connected to the outputs of gates 16a and 16b. In this way, if only one of the two signal channels has an input signal, the flip flop 21 will still be reset until the period of the input signal is less than that of the respective reference generator signal.

Considering now the operation of the invention, assume for purposes of simplicity that only catapult engine 10a will be used to launch a particular aircraft. In this case, the catapult engine 10a will be brought to a prelaunch condition and the tachometer-generator 11a will provide a rectangular pulse output signal having a period proportional to the engine speed. Assume further that the period of the one-shot reference generator is adjusted such that it corresponds to the desired launch condition of the catapult engine. The rectangular pulses from the tachometer-generator 11a are then converted to a symmetrical square wave in the symmetry flip flop 12a. The A output of the symmetry flip flop 12a then causes the one-shot reference generator 13a to provide its preset output pulses B and $\overline{B}$ each time the A output from the symmetry flip flop 12a switches from a logical "0" to a logical "1" state. The period of the signals A and B are then compared in the comparator gate 14a which, as previously described, provides no output until the period of the input signal A from the symmetry flip flop 12a is less than that of the period of the input signal B from the one-shot reference generator 13a. The gate 16a, however, having $\overline{A}$ and $\overline{B}$ as inputs, provides outputs similar to that illustrated on line D of FIG. 2 to the reset input of the storage flip flop 15a for insuring that its output remains in the logical "0" state until the period of the input signal from the symmetry flip flop 12a is less than the period of the one-shot reference generator signal.

As illustrated in FIG. 2, the period of the input signal is decreasing with time (as the catapult engine speeds up) and, accordingly, at some time, $t_0$, the period of the input signal from the symmetry flip flop 12a is less than the period of the one-shot reference generator signal 13a. At this point, the comparator gate 14a produces a pulse having a width equal to the difference in periods of the two input signals. This condition is illustrated on line C of FIG. 2. As a result of this output pulse, the storage flip flop 15a is switched to the logical "1" state and provides the output signal illustrated on line E of FIG. 2.

Since only catapult engine 10a is being used for launching, the selector switch 18 is adjusted to provide a logical "1" output on conductor 20 and a logical "0" output on conductor 19, thereby causing a continuous logical "0"

to appear at the output of gate 17b. At the time $t_0$ gate 17a will switch from a logical "1" to a logical "0," and the two logical "0" conditions appearing at the input of gate 17c will cause a logical "0" to appear at its output as illustrated on line F of FIG. 2. Accordingly, the output flip flop 21 is driven to its logical "1" condition as illustrated in line G of FIG. 2 and the brake release mechanism 22 is energized thereby causing the aircraft to be launched.

If it is desired to employ both catapult engines 10a and 10b to launch an aircraft, then the selector switch 18 is adjusted so that logical "0's" appear on conductors 19 and 20. During this launching condition, it is then necessary that output signals are obtained from both comparator gates 14a and 14b and consequently storage flip flops 15a and 15b before an output signal will appear from the selection gate 17. By this arrangement, aircraft launching is detained until both engines have reached the proper launch conditions.

Obviously, many modifications and variations of the present invention may be resorted to by those skilled in the art without departing from the spirit and scope of the invention. For example, the same logical functions may be performed by different logical elements than those disclosed herein. It is therefore to be understood, that within the scope of the appended claims, the invention may be practiced otherwise than as specifically described.

What is claimed is:

1. An apparatus for sensing the frequency of an input signal comprising:
    means responsive to a transition of said input signal to a predetermined logic state for generating a reference signal having a predetermined period;
    means to compare the period of said reference signal with the period of said input signal in said predetermined logic state for providing an output signal in response to said logic state period of said input signal being of shorter duration than said reference signal period;
    means to store said output signal; and
    means responsive to the complements of said input signal and said reference signal to reset said means to store when said logic state period of said input signal is greater than the period of said reference signal.

2. An apparatus as recited in claim 1 further comprising:
    means responsive to a transition of another input signal to a predetermined logic state for generating another reference signal having a predetermined period;
    means to compare the period of said other reference signal with the period of said other input signal in said predetermined logic state for providing another output signal in response to said logic state of said other input signal being of shorter duration than said other reference signal period;
    means to store said other output signal;
    means responsive to the complements of said other input signal and said other reference signal to reset said means to store said other output signal when said logic state period of said other input signal is greater than the period of said other reference signal; and
    means to provide a control signal in response to selected ones of said output signals.

3. An apparatus as recited in claim 2 wherein said means to compare comprises:
    a two-input logic gate to provide a predetermined output only when the two inputs are of the same predetermined logic level.

4. An apparatus as recited in claim 3 wherein said means to generate a reference signal comprises:
    a one-shot reference generator to provide a selectively variable period reference signal.

5. An apparatus as recited in claim 4 wherein said means to reset comprises:
    a two-input logic gate to provide an output only when the two inputs are of the same predetermined logic level.

6. An apparatus as recited in claim 5 wherein said means to provide a control signal comprises:
    a selector switch having first and second output control lines;
    a first logic gate connected to receive said output signal and said first output control line;
    a second logic gate connected to receive said other output signal and said second output control line, said first and second logic gates providing an output only when both inputs are of the same predetermined logic level; and
    a third logic gate connected to receive the outputs of said first and second logic gates and provide an output only when both inputs are of the same predetermined logic level;
    whereby said selector switch controls which of said logic gates is enabled by said output signals.

7. An apparatus as recited in claim 6 further comprising:
    a flip flop having an input connected to the output of said third logic gate to provide said control signal; and
    means responsive to the outputs from each of said reset means to provide a reset signal to said flip flop when the period of either of said input signals is greater than its respective reference signal.

8. And apparatus for controlling a brake release mechanism in response to the speed of a catapult engine comprising:
    means adapted to be connected to said engine to provide a symmetrical square wave signal having a period proportional to the speed of said engine;
    means responsive to said square wave signal to generate a reference signal having a predetermined period;
    means to compare the period of said reference signal with the period of said square wave signal and provide an output signal in response thereto;
    means responsive to said output signal to provide a control signal adapted to actuate said brake release mechanism;
    means adapted to be connected to another catapult engine to provide another symmetrical square wave signal having a period proportional to the speed of said other engine;
    means responsive to said other square wave signal to generate another reference signal having a predetermined period;
    means to compare the period of said reference signal with the period of said other square wave signal and provide another output signal to said means to provide a control signal; and
    said means to provide a control signal includes a selector switch having first and second output control lines, a first logic gate connected to receive said output signal and said first output control line, second logic gate connected to receive said other output signal and said second output control line, said first and second logic gates providing an output only when both inputs are of the same predetermined logic level, a third logic gate connected to receive the outputs of said first and second logic gates and provide an output only when both inputs are of the same predetermined logic level, whereby said selector switch controls which of said logic gates is enabled by said output signals.

9. An apparatus as recited in claim 8 further comprising:
    a flip flop having an input connected to the output of said third logic gate to provide said control signal; and
    means responsive to each of said reference signals and said square wave signals to provide a reset signal to said flip flop when the period of either of said square wave signals is greater than its respective reference signal.

10. An apparatus as recited in claim 9 wherein each of said means to compare comprises:
a two-input logic gate to provide an output only when the two inputs are of the same predetermined logic level.

11. An apparatus as recited in claim 10 wherein each of said means to generate a reference signal comprises:
a one-shot reference generator to provide a selectively variable period reference signal.

12. An apparatus as in claim 11 further comprising:
a brake release mechanism responsive to said control signal; and
said means adapted to be connected to said engines each including both a tachometer-generator to provide tachometer signals having a frequency proportional to the respective speed of said engine and a symmetry flip-flop responsive to said tachometer signal to provide a symmetrical square wave proportional to said tachometer signal.

References Cited

UNITED STATES PATENTS

| | | | |
|---|---|---|---|
| 3,146,432 | 8/1964 | Johnson | 340—263 |
| 3,226,577 | 12/1965 | Azuma | 307—234 |
| 3,408,581 | 10/1968 | Wakamoto | 328—109 |
| 3,413,490 | 11/1968 | Breunig | 328—110 |
| 3,428,824 | 2/1969 | Linardos | 307—218 |

OTHER REFERENCES

S. L. U. Chari: Electronic Tachometer, February 1967, Wireless World, pp. 81–83.

JOHN S. HEYMAN, Primary Examiner

D. M. CARTER, Assistant Examiner

U.S. Cl. X.R.

324—10; 328—110, 134, 141